May 27, 1958   J. C. GRIFFIN   2,836,112
HITCH ATTACHMENT FOR A POWERED VEHICLE
Filed Aug. 24, 1955   3 Sheets-Sheet 1
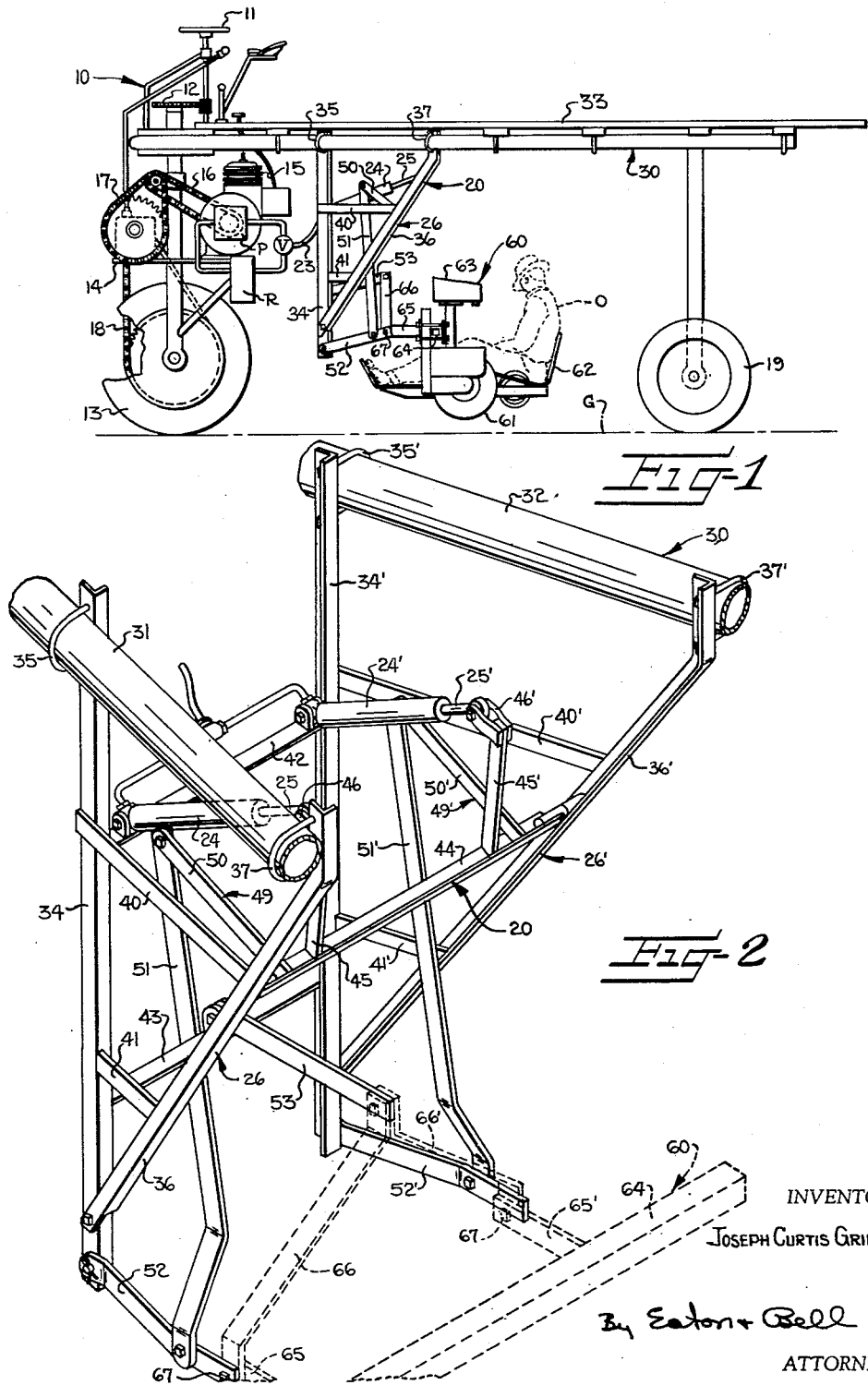
INVENTOR:
JOSEPH CURTIS GRIFFIN
By Eaton + Bell
ATTORNEYS May 27, 1958 J. C. GRIFFIN 2,836,112
HITCH ATTACHMENT FOR A POWERED VEHICLE
Filed Aug. 24, 1955 3 Sheets-Sheet 2

JOSEPH CURTIS GRIFFIN,
INVENTOR

BY Eaton + Bell
ATTORNEYS

May 27, 1958 J. C. GRIFFIN 2,836,112
HITCH ATTACHMENT FOR A POWERED VEHICLE
Filed Aug. 24, 1955 3 Sheets-Sheet 3

JOSEPH CURTIS GRIFFIN,
INVENTOR.

BY Eaton + Bell

ATTORNEYS

United States Patent Office 2,836,112
Patented May 27, 1958

2,836,112
HITCH ATTACHMENT FOR A POWERED VEHICLE

Joseph Curtis Griffin, Branford, Fla.

Application August 24, 1955, Serial No. 530,277

9 Claims. (Cl. 97—47.43)

This invention relates to couplings or hitch attachments and more particularly to a hitch attachment suspended from the frame of a powered vehicle for pulling a farm implement therewith. Some powered vehicles such as tobacco harvesters of the type disclosed in Patent No. 2,672,248 have their frames positioned a substantial distance above the surface of the earth and their front and rear wheels spaced a considerable distance apart from each other to provide sufficient area therebetween for a farm implement to be pulled by the powered vehicle between the wheels of the same. It is with these types of powered vehicles that the invention is particularly applicable.

It is therefore an object of the invention to provide a novel hitch attachment suspended from the frame of a powered vehicle whereby a farm implement may be readily carried by the powered vehicle between the wheels thereof.

It is another object of the invention to provide means on the hitch attachment for elevating the farm implement so the same may be transported in elevated position, or elevated for turning around at the end of a field.

It is a further object of the invention to provide a hitch attachment having a plurality of connecting levers for securing a farm implement thereto wherein the connecting levers are arranged to insure the elevating of the farm implement in substantially a horizontal plane to prevent tilting of the same.

For purposes of illustration a powered vehicle in the form of a tobacco harvester has been shown, but it is understood that the invention is not restricted to this particular type of vehicle but may be used with any type of vehicle having a wheeled frame spaced a substantial distance above its supporting surface and having space between its wheels to accommodate the auxiliary implement.

Some of the objects of the invention having been stated, other objects will appear as the description proceeds when taken in connection with the accompanying drawings, in which—

Figure 1 is an elevational view of a tobacco harvester with some of its normal components removed with the hitch attachment secured to the frame thereof for pulling a transplanter device;

Figure 2 is an isometric view on an enlarged scale of the medial portion of Figure 1 showing the new and novel hitch attachment;

Figure 3:
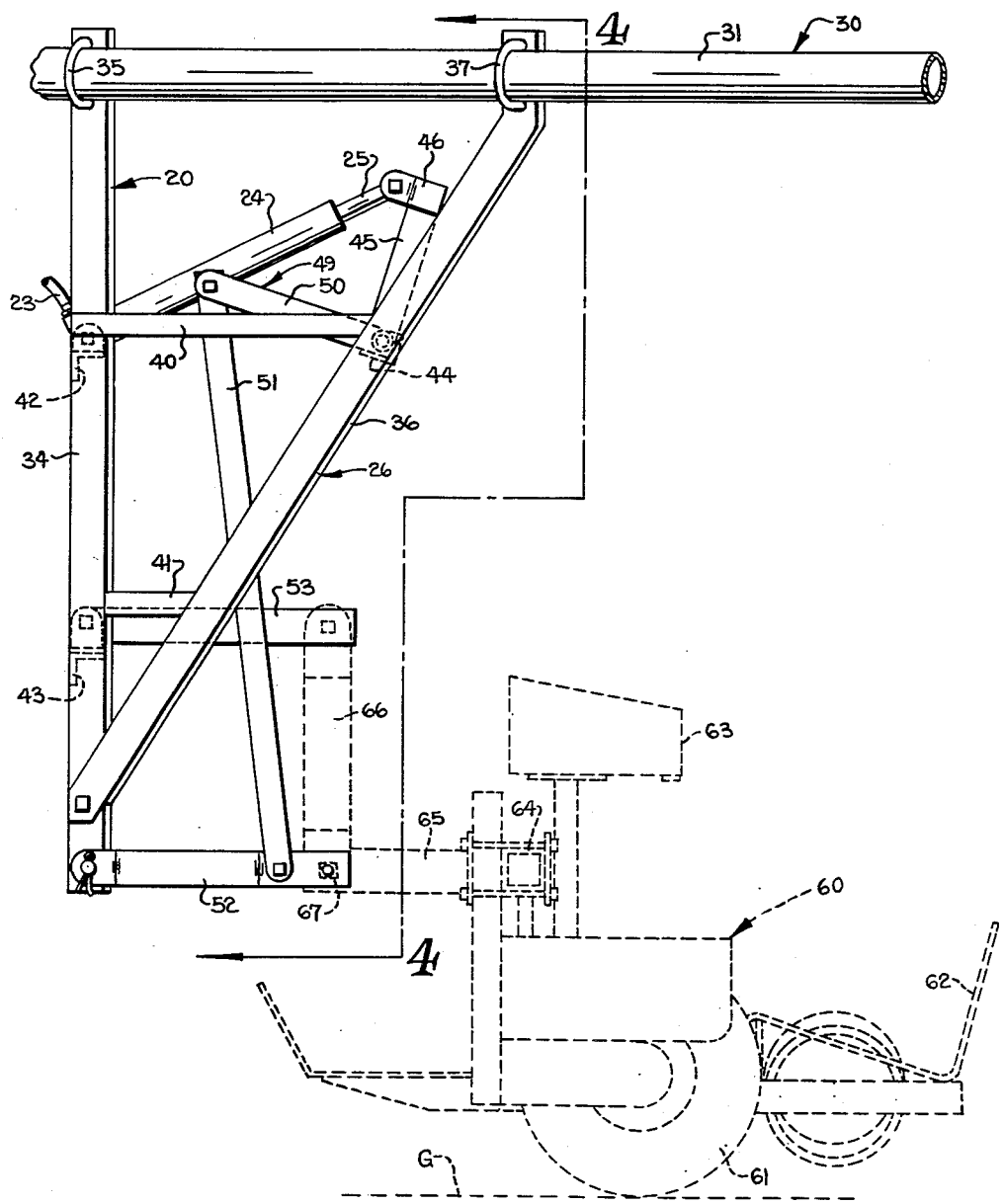
Figure 3 is a greatly enlarged view of the medial portion of Figure 1 showing the hitch attachment in solid lines and the transplanter device in phantom lines.
Figure 4:
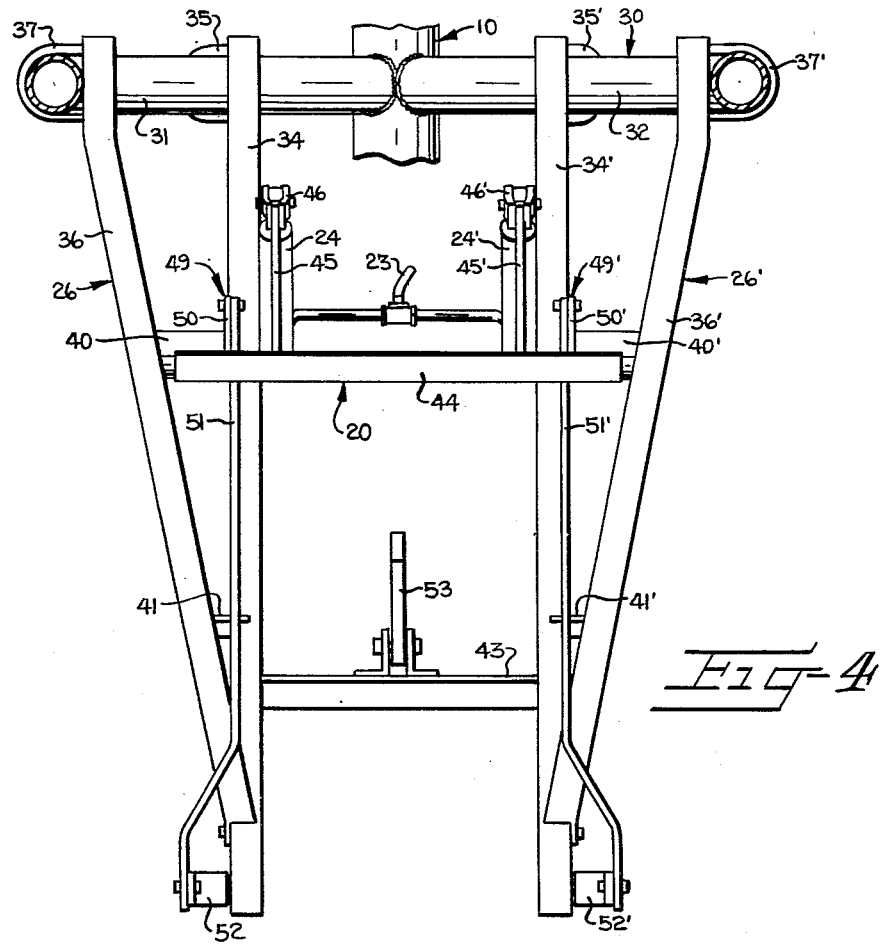
Figure 4 is a front elevation of the hitch attachment taken on line 4—4 of Figure 3.

Referring more specifically to the drawings, reference numeral 10 broadly indicates a tobacco harvester of the type shown in detail in Patent No. 2,672,248 which has a steering wheel 11 for turning a gear 12 for steering a front wheel 13 thereof to guide the tobacco harvester in its path of travel. The harvester is provided with a pair of rear wheels 19, only one of which is shown in Figure 1. A platform 14 is provided for supporting an internal combustion engine 15 which imparts rotative movement to the front wheel 13 through suitable driving chains 16, 17 and 18. A gear type of pump P (Figures 1 and 5) is also operated by the internal combustion engine 15 for moving hydraulic fluid from a reservoir R through suitable fluid lines, a valve V, and a main fluid line 23 to a pair of hydraulic cylinders 24, 24', each having suitable pistons 25, 25', respectively. The pistons 25, 25' are employed for elevating portions of a hitch attachment broadly indicated by reference numeral 20 for elevating a farm implement such as a transplanter 60 secured to portions thereof so the same may be transported in elevated position. It will be observed in Figure 1 that the transplanter device 60 is shown in elevated position above the ground G. The transplanter 60 shown for purposes of illustration of the invention is of the type disclosed in Patent No. 2,584,012.

The tobacco harvester 10 is provided with a main frame broadly indicated at 30 comprising a pair of spaced tubular frame members 31, 32 respectively having their inner ends adjacent the front portion of the tobacco harvester in close proximity to each other with their outer ends flaring outwardly or diverging to provide space for a suitable platform 33 thereabove and between said frame members. It will be observed in Figure 1 that the frame 30 is positioned a substantial distance above the ground G.

The hitch attachment 20 has a pair of spaced sides 26, 26' of identical construction in the form of A-frame members and therefore the numerals applied to one of the sides will be applied to the other side with the prime notation added thereto for simplicity of description. Each of the sides 26, 26' has a vertically positioned supporting member 34, 34', respectively, shown in the form of angle members, which are suitably secured to the spaced frame members 31, 32, by any suitable means such as U-shaped bolts 35, 35'. Substantially vertically positioned supporting members 36, 36' spaced rearwardly of the supporting members 34, 34' are also suitably secured to the spaced frame members 31, 32 by any suitable means such as U-shaped bolts 37, 37', respectively, and have their lower ends fixedly secured to a lower portion of the upright supporting members 34, 34', respectively. Upper and lower cross members 40, 40', 41, 41', respectively, are provided for connecting together the upright members 34, 36 and 34', 36', respectively.

A cross member 42 shown in the form of an angle iron secures the upright supporting members 34, 34' of the sides 26, 26' to each other and has pivotally secured thereon the rear end of the hydraulic cylinders 24, 24'. A lower cross member 43 is also provided adjacent the lower ends of the upright members 34, 34' for securing the same together and properly bracing the same in spaced relation. For bracing the rear portions of the side members 26, 26' and for securing the same in spaced relation, a cross member 44 is provided which is pivotally secured to the upright members 36, 36'. Fixedly secured to the cross member 44 is a pair of spaced relatively short piston supporting braces or rods 45, 45' each having bifurcated upper ends 46, 46' to which is secured the pistons 25, 25' for pivoting the cross member 44 and to elevate a boom broadly indicated at 49 for elevating the transplanter 60.

The boom 49 comprises a pair of spaced members 50, 50' which are fixedly secured to the pivotally mounted cross member 44 and extend upwardly therefrom and have pivotally secured to their upper ends elevating rods 51, 51' each of which extend downwardly in spaced relation with outwardly flaring or diverging lower ends which are pivotally secured to a pair of spaced horizontally positioned connecting levers 52, 52' which are pivotally secured to the lower ends of the vertical supporting members 34, 34'. A connecting rod or lever 53 has one end pivotally secured to a medial portion of the cross member 43 for connecting the transplanter device 60 thereto for elevating the same as shown in Figure 1.

The transplanter device 60 is provided with a pair of spaced wheels 61, only one of which is shown in the drawings, and a seat or back rest 62 for supporting an operator O who takes plants from a plant hopper 63 and plants the same in the ground G as the transplanter 60 is moved forwardly by the tobacco harvester 10. As shown in Figure 2 in phantom lines, the front portion of the transplanter 60 is provided with a cross member 64 serving as a draw bar to which is fixedly secured a pair of spaced members 65, 65' which are fixedly secured to a pair of upwardly diverging members 66, 66', the upper ends of which are pivotally secured to the outer end of the lever 53. The members 65, 66 and 65' and 66' are fixedly secured to each other to act as a bell crank and are pivotally secured to the outer ends of the connecting levers 52, 52' by any suitable means such as bolts 67.

Figure 5:
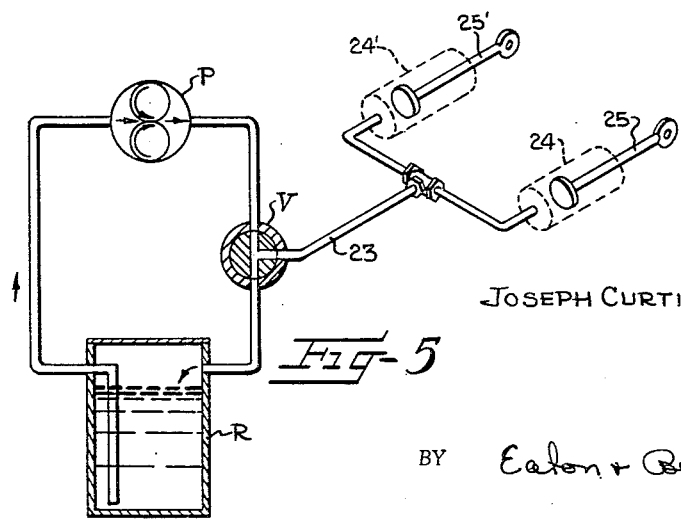
Figure 5 is a schematic view of a hydraulic system for elevating portions of the hitch attachment.

In normal operation the transplanter 60 has its wheels 61 in engagement with the surface of the ground G as shown in Figure 3 to enable the occupants riding the same to readily move plants from the plant hopper 63 and plant the same in the ground. However, when it is desired to turn around at the end of a planted row or to transport the transplanter 60 in elevated position, the valve V shown in Figure 5 is moved ninety degrees counterclockwise to permit the fluid being pumped by the pump P to be directed into the line 23 to exert a pressure on the heads of the pistons 25, 25' to move the same outwardly from inside the cylinders 24, 24' to elevate the transplanter device 60.

It will be observed by a comparison of Figure 1 with Figure 3 that the movement of the pistons 25, 25' outwardly from the cylinders 24, 24' causes the cross member 44 to be pivoted on the supporting members 36, 36' to elevate the rod or lever 51 of the boom 49, which in turn will elevate the outer ends of the connecting members 52, 52' to lift the transplanter 60 out of engagement with the ground G. It will be observed in Figures 1 and 2 that an upward pivotal movement of the pair of spaced connecting levers 52, 52' also causes an upward pivotal movement of the upper connecting lever 53 which is pivotally mounted to the cross member 43 to elevate the transplanter device 60 in a substantially horizontal plane to thus avoid any tilting of the same. As previously stated the connecting levers 66, 65 forming a part of the transplanter 60 are fixedly secured to each other to act as a bell crank to insure that the transplanter 60 does not tilt as it is being elevated by the hydraulic pistons.

Although the invention is described and illustrated as applied to a transplanter it is to be distinctly understood that the new and novel hitching attachment is equally applicable for pulling and elevating disks, harrows or the like without departing from the spirit of the invention.

In the drawings and specification there has been set forth a preferred embodiment of the invention, and although specific terms are employed, they are used in a generic and descriptive sense only and not for purposes of limitation, the scope of the invention being defined in the claims.

I claim:

1. In a tobacco harvester device having power means for propelling the same, a pair of spaced frame members positioned a substantial distance above the ground, and having means for building up a fluid pressure, in combination therewith; a hitch assembly for pulling and elevating a farm implement, said hitch assembly comprising a pair of spaced A-frame side members, means connecting said side members to said pair of frame members, a plurality of cross members connecting said side members together, one of said cross members being pivotally mounted to said side members and connecting rear portions of said side members, a pair of connecting levers pivotally secured to the lower ends of said side members for attaching a farm implement thereto, a boom comprising pivotally connected parts, the free end of one of the parts being fixedly secured to said pivotally mounted cross member and the free end of another part being pivotally connected to said connecting levers, and hydraulic means operably connected to said pivotally mounted cross member to pivot the same whereby upon said hydraulic means being actuated, said pivotally mounted cross member will be pivoted to elevate said boom to elevate said connecting levers and the farm implement connected thereto.

2. In a tobacco harvester device having power means for moving the same, a hydraulic system, said power means also serving to maintain a fluid pressure in said hydraulic system, and a pair of frame members positioned a substantial distance above the surface of the earth, in combination therewith a hitch attachment secured to said pair of frame members and depending downwardly therefrom for securing a farm implement thereto to be pulled and elevated during its operation, said hitch attachment comprising a pair of spaced side members, a plurality of cross members connecting said side members, at least one of said cross members being pivotally mounted, at least one piston operatively connected to said hydraulic system and to the pivotally mounted cross member, a boom assembly comprising pivotally connected parts, the free end of one of the parts being fixedly secured to said pivotally mounted cross member, a pair of connecting levers pivotally secured to the lower end portions of said side members for connecting the farm implement thereto, an upper connecting lever pivotally secured to one of said cross members also for connecting the farm implement thereto, and the free end of another part of said boom assembly being pivotally connected to said pair of connecting levers whereby upon said piston being actuated, the boom assembly will elevate the farm implement.

3. In a tobacco harvester device having power means for propelling the same, means for building up a pressure in a hydraulic line, and a pair of spaced frame members positioned a substantial distance above the surface of the earth, the combination therewith of a hitch assembly secured to said frame members and depending therefrom for attaching a farm implement thereto for being pulled by the harvester upon movement being imparted thereto, said hitch assembly comprising a pair of spaced A-frame side members, a plurality of cross members fixedly connecting said A-frame side members in spaced relation, a pivotally mounted cross member connecting said side members, means for elevating the farm implement comprising a boom having pivotally connected parts, the free end of one of the parts being fixedly connected to said pivotally mounted cross member, hydraulic means secured to said pivotally mounted cross member to impart pivotal movement to said cross member when the farm implement is to be elevated, a pair of connecting levers pivotally mounted on the lower ends of said side members and extending rearwardly therefrom to connect the front end of the farm implement, a connecting lever spaced above said pair of levers and being pivotally mounted to a medial portion of one of said plurality of fixedly secured cross members to also connect the front end of the farm implement, and the free end of another part of said boom being pivotally connected to said pair of connecting levers whereby upon said pivotally mounted cross member being pivoted by said hydraulic means the boom will be elevated to elevate the farm implement secured to said connecting levers.

4. In a tobacco harvester device having power means for propelling the same and a pair of spaced frame members positioned a substantial distance above the surface of the earth, the combination therewith of a hitch assembly secured to said frame members and depending therefrom for attaching a farm implement thereto for being pulled by the harvester, said hitch assembly comprising a pair of spaced side members, a plurality of cross members fixedly connecting said side members in spaced relation, a pivotally mounted cross member connecting said side members, means for elevating the farm implement comprising a boom having pivotally connected parts, the free end of one of the parts being fixedly connected to said pivotally mounted cross member, means secured to said pivotally mounted cross member to impart pivotal movement to said cross member when the farm implement is to be elevated, a pair of connecting levers pivotally mounted on the lower ends of said side members and extending rearwardly therefrom to connect the front end of the farm implement, a connecting lever pivotally mounted to a medial portion of one of said plurality of fixedly secured cross members to also connect the front end of the farm implement, and the free end of another part of said boom being pivotally connected to said pair of connecting levers whereby upon said pivotally mounted cross member being pivoted, the boom will be elevated to elevate the farm implement secured to said connecting levers.

5. In a tobacco harvester device having power means for propelling the same, and a pair of spaced frame members positioned a substantial distance above the surface of the earth, the combination therewith of a hitch assembly secured to said spaced frame members and depending therefrom for securing a farm implement thereto for being pulled by the harvester, said hitch assembly comprising a pair of spaced side members, a plurality of cross members fixedly connecting said side members, a pair of connecting levers pivotally mounted on the lower ends of said side members and extending rearwardly therefrom to connect the front end of the farm implement, a connecting lever pivotally mounted to one of said plurality of fixedly secured cross members and spaced above said pair of connecting levers to also connect the front end of the farm implement, a pivotally mounted cross member connecting said side members, a boom comprising pivotally connected parts, the free end of one of the parts being fixedly secured to said pivotally mounted cross member and the free end of another part being pivotally connected to said pair of connecting levers, and means for pivoting said pivotally mounted cross member whereby the boom will elevate the farm implement in substantially a horizontal plane.

6. In combination with a powered vehicle having its front and rear wheels positioned a substantial distance apart from each other and having its frame positioned a substantial distance above the front and rear wheels thereof; a hitch attachment suspended from said frame of the powered vehicle between the front and rear wheels thereof for securing a farm implement to the lower end thereof for being pulled by the powered vehicle, said hitch attachment comprising a pair of spaced side members, a plurality of cross members fixedly connecting said side members, a pair of connecting levers pivotally mounted on the lower ends of said side members and extending rearwardly therefrom to connect the front end of the farm implement thereto, a pivotally mounted cross member connecting said side members, a boom comprising pivotally connected parts, the free end of one of the parts being fixedly secured to said pivotally mounted cross member and the free end of another part of the boom being pivotally connected to said connecting levers, and means operably connected to said pivotally mounted cross member to pivot the same whereby the boom will be elevated to lift the farm implement off the ground in substantially a horizontal plane.

7. In combination with a powered vehicle having its front and rear wheels positioned a substantial distance apart from each other and having its frame positioned a substantial distance above the surface of the earth; a hitch attachment suspended from said frame of the powered vehicle between the front and rear wheels thereof for securing a farm implement to the lower end thereof for being pulled by the powered vehicle, said hitch attachment comprising a pair of spaced side members, a plurality of cross members fixedly connecting said side members, a pair of connecting levers pivotally mounted on the lower ends of said side members and extending rearwardly therefrom to connect the front end of the farm implement thereto, a connecting lever pivotally mounted to one of said plurality of fixedly secured cross members and spaced above said pair of connecting levers to also connect the front end of the farm implement, a pivotally mounted cross member connecting said side members, a boom comprising pivotally connected parts, the free end of one of the parts being fixedly secured to said pivotally mounted cross member and the free end of another part being pivotally connected to said pair of connecting levers, and hydraulic means for pivoting said pivotally mounted cross member whereby the boom will be elevated to lift the farm implement off the ground.

8. In a tobacco harvester device having power means for propelling the same, means for building up a pressure in a hydraulic line, and a pair of spaced frame members positioned a substantial distance above the surface of the earth, the combination therewith of a hitch assembly secured to said frame members and depending therefrom for securing a farm implement thereto for being pulled by the harvester, said hitch assembly comprising a pair of spaced side frame members, a plurality of cross members fixedly connecting said side frame members, a pair of connecting levers pivotally mounted on the lower ends of said side frame members and extending rearwardly therefrom to connect the front end of the farm implement, a connecting lever pivotally connected to one of said plurality of fixedly secured cross members and spaced above said pair of connecting levers to also connect the front end of the farm implement whereby upon movement being imparted to the tobacco harvester the farm implement will be pulled, a pivotally mounted cross member connecting said side members, means for elevating the farm implement comprising a boom having pivotally connected parts, the free end of one of the parts being fixedly connected to said pivotally mounted cross member and the free end of another part being pivotally connected to said pair of levers, and hydraulic means connected to said hydraulic line and operatively secured to said pivotally mounted cross member to impart pivotal movement to said cross member when the farm implement is desired to be elevated whereby the farm implement will be elevated in substantially a horizontal plane.

9. In a tobacco harvester device having power means for propelling the same, and a pair of spaced frame members positioned a substantial distance above the surface of the earth, the combination therewith of a hitch assembly secured to said spaced members and depending therefrom for securing a farm implement thereto for being pulled by the harvester, said hitch assembly comprising a pair of spaced side members, a plurality of cross members fixedly connecting said side members, a pair of connecting levers pivotally mounted on the lower ends of said side members and extending rearwardly therefrom to connect the front end of the farm implement, a pivotally mounted cross member connecting said side members, a boom comprising pivotally connected parts, the free end of one of the parts being fixedly secured to said pivotally mounted cross member and the free end of another part being pivotally connected to said connecting levers, and means for pivoting said pivotally mounted cross member whereby the boom will elevate the farm implement in substantially a horizontal plane.

References Cited in the file of this patent

UNITED STATES PATENTS

| | | |
|---|---|---|
| 2,383,386 | Hipple | Aug. 21, 1945 |
| 2,560,702 | Reaves | July 17, 1951 |
| 2,687,238 | Tanke | Aug. 24, 1954 |